United States Patent
Sharma

(10) Patent No.: US 9,460,059 B2
(45) Date of Patent: Oct. 4, 2016

(54) METHOD AND APPARATUS FOR VISUALIZING THE UNDERLYING STRUCTURE OF A DOCUMENT USING AN INTERACTIVE VIEWPORT OVERLAY

(71) Applicant: Adobe Systems Inc., San Jose, CA (US)

(72) Inventor: Ashutosh Jagdish Sharma, Noida (IN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 625 days.

(21) Appl. No.: 13/780,099

(22) Filed: Feb. 28, 2013

(65) Prior Publication Data
US 2014/0245126 A1  Aug. 28, 2014

(51) Int. Cl.
*G06F 17/00* (2006.01)
*G06F 17/21* (2006.01)
*G06F 17/22* (2006.01)

(52) U.S. Cl.
CPC ........ *G06F 17/2241* (2013.01); *G06F 17/2247* (2013.01)

(58) Field of Classification Search
CPC ........................... G06F 17/2241; G06F 17/227
See application file for complete search history.

(56) References Cited

U.S. PATENT DOCUMENTS

| | | | |
|---|---|---|---|
| 6,144,962 A | 11/2000 | Weinberg et al. | |
| 7,802,182 B2 * | 9/2010 | Bales | 715/235 |
| 2008/0046562 A1 | 2/2008 | Butler | |
| 2012/0324345 A1 * | 12/2012 | Kaufthal et al. | 715/255 |
| 2013/0007577 A1 * | 1/2013 | Hammoud | 715/205 |
| 2013/0007579 A1 * | 1/2013 | Dancy et al. | 715/205 |

OTHER PUBLICATIONS

J. Nathan Matias, "Putting Voldemort into the Guardian: Remixing the News with Hackasaurus." Published on Nov. 8, 2011, Youtube, pp. 1-29.*
"Web X-Ray Goggles," published on Jul 30, 2012, Github, pp. 1-2.*
Steven Bradley, "Z-index and the CSS stack: which element Displays First?," published on Dec. 2, 2009 by vanseo Design, pp. 1-24.*
Jess Klein, "X-Ray Vision Goggles Palette," published Dec. 25, 2010 by flickr, p. 1.*
GeekThis, "Google Chrome: Inspect Element/Developer Tools," published Dec. 21, 2012, Youtube.com, pp. 1-14.*
F.J.A. Boerboom et al., "Fact Extraction, Querying and Visualization of Large C++ Code Bases", Master's Thesis, Technische Universiteit Eindhoven, Department of Mathematics and Computer Science, Aug. 2006, 105 pgs.

(Continued)

*Primary Examiner* — Ariel Mercado
(74) *Attorney, Agent, or Firm* — Keller Jolley Preece

(57) ABSTRACT

A method and apparatus for visualizing the underlying structure of a document using an interactive viewport overlay is disclosed. The method comprises accessing a document having a structure comprising a plurality of elements; displaying visible elements of the plurality of elements of the document; creating a new element for a corresponding one of each of a plurality of the visible elements, wherein each new element identifies structural information about a corresponding visible element; and displaying one or more overlays on top of an area of the displayed document, wherein the one or more overlay is less than the entire area of the displayed document, and wherein each overlay comprises the new elements displaying an underlying structure of the displayed document.

17 Claims, 7 Drawing Sheets

(56) References Cited

OTHER PUBLICATIONS

E. Boezeman, "DomScape: 3D web development an integrated visualization of code and layout", Chalmers University of Technology, Department of Computer Science and Engineering, Goteborg, Sweden, Nov. 2010, 56 pgs.

Steven Xinyue Gao, "FireInsight: Understanding JavaScript Behaviors in Web Pages by Visually Exploring the Browser", The University of British Columbia, Vancouver, Canada, Dec. 2009, 130 pgs.

* cited by examiner

METHOD AND APPARATUS FOR VISUALIZING THE UNDERLYING STRUCTURE OF A DOCUMENT USING AN INTERACTIVE VIEWPORT OVERLAY

BACKGROUND OF THE INVENTION

1. Field of the Invention

Embodiments of the present invention generally relate to web page management and visualization tools and more particularly, to a method and apparatus for visualizing the underlying structure of a document using an interactive viewport overlay.

2. Description of the Related Art

Documents such as web pages and graphic compositions made using multiple layers can have complex structures that are difficult to visualize and understand. In the case of a web page, its structure, represented by document object model (DOM) nodes, is a hierarchical tree and can get very deep and complex. A DOM presents a document as a hierarchy of node objects called elements. The node at the top of the hierarch is the root node. For example, the document itself is the root node. Within the document are other elements arranged according to the hierarchical structure. For example, if the document is an online newspaper, each article in the newspaper may be an element. Within each article, the title, byline, and text may be additional elements. In this example, each article is an element that is one step deeper in the hierarchy, in this case, one step below the root node. Each additional element of each article is one step deeper in the hierarchy than the article to which it relates. All elements have a value on a z-axis of the hierarchy, called the z-order. An element's z-order identifies how many steps in the hierarchy the element is from the root node. In this example, the article element has a z-order of 1, meaning it is one step below the root node. A relationship is also definable between the elements of the hierarchy. In this example, the document, or root node, is referred to as a parent to each element that is one step below it; in this case, the document is a parent to each article. Each article element is referred to as a child of the document node. Elements that are one step below each article element are children of the article element. Elements that have the same z-order value, meaning they are at the same depth below the root node, are referred to as siblings.

A web developer or designer often needs to understand the hierarchical structure of existing web pages in order to modify and debug them. Existing mechanisms to understand a page's structure include developer tools that show a tree-like structure that represents the node-hierarchy of the elements of the page. Other mechanisms allow a user to inspect elements on the page one-by-one and then show their details (such as their node-hierarchy). Still other mechanisms look at the source text for a web page and try to understand the structure from the source text. These mechanisms display the DOM hierarchy, but force the user to switch to a different view in order to do so.

Therefore, there is a need for a method and apparatus for visualizing the underlying structure of a document using an interactive viewport overlay.

SUMMARY OF THE INVENTION

A method and apparatus for visualizing the underlying structure of a document using an interactive viewport overlay substantially as shown in and/or described in connection with at least one of the figures, as set forth more completely in the claims.

These and other features and advantages of the present disclosure may be appreciated from a review of the following detailed description of the present disclosure, along with the accompanying figures in which like reference numerals refer to like parts throughout.

Figure 1:
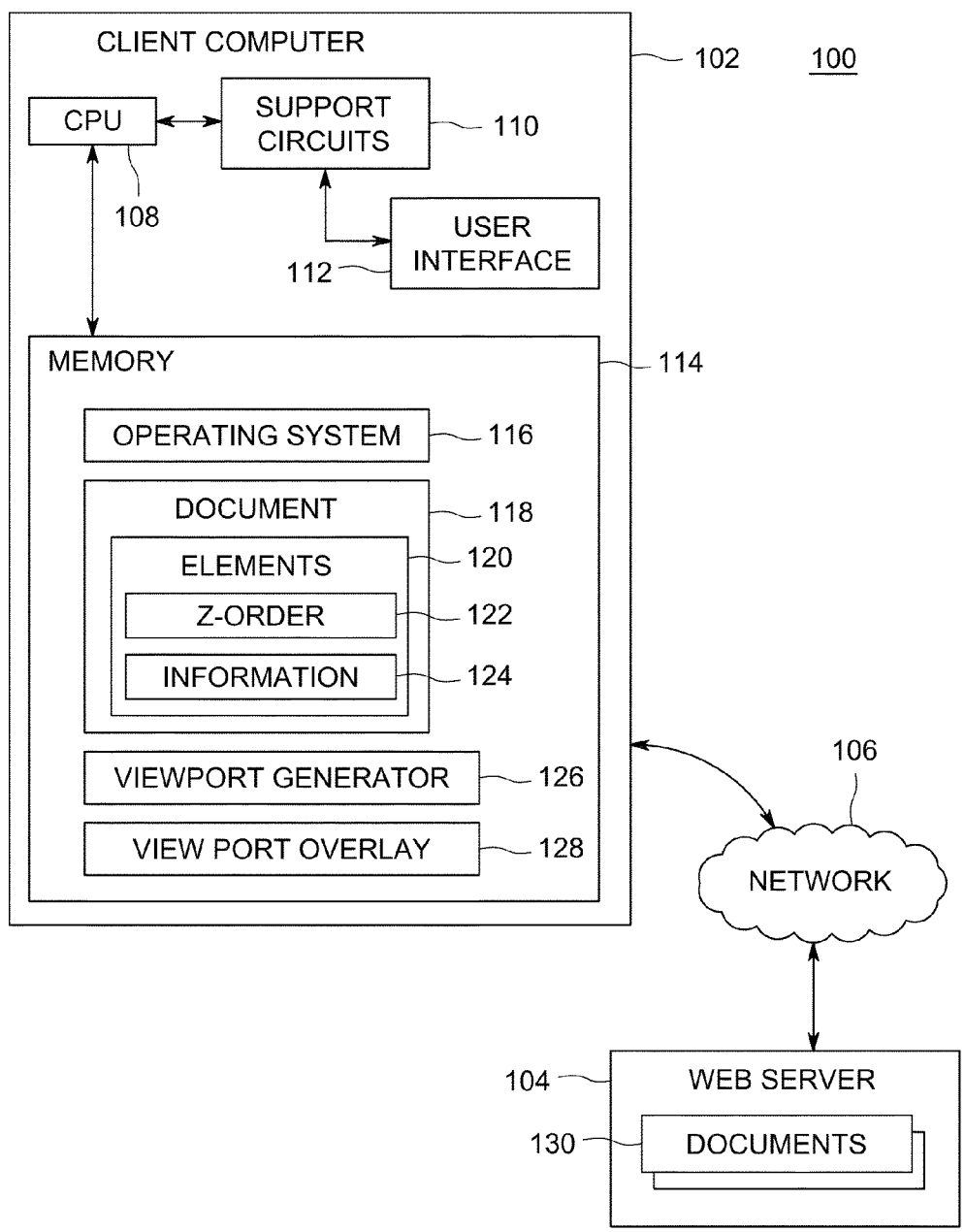
FIG. 1 depicts a block diagram of an apparatus for visualizing the underlying structure of a document using an interactive viewport overlay, according to one or more embodiments of the invention.

While the method and apparatus is described herein by way of example for several embodiments and illustrative drawings, those skilled in the art will recognize that the method and apparatus for visualizing the underlying structure of a document using an interactive viewport overlay are not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for visualizing the underlying structure of a document using an interactive viewport overlay as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to. The term "document" may be used to describe documents, web pages, or any viewable source having a node-hierarchical structure.

DETAILED DESCRIPTION OF EMBODIMENTS

Embodiments of the present invention include an apparatus for visualizing the underlying structure of a document using an interactive viewport overlay. Embodiments of the invention provide a viewport overlay, i.e., a rectangular viewing region that provides a view of a document's structure as an overlay on the actual content of the document. A viewport overlay, smaller than the full size of the document, allows a user to view information about the various elements (e.g., their Hyper Text Markup Language (HTML) tag names and classes, for a web page) of a document at the same location as that of the original elements. The invention is described using HTML as an exemplary embodiment, however, the invention is applicable to any document that has a hierarchical structure, for example, and not limited to, the layer structure in a PHOTOSHOP® (.psd file) document. The structural information has information-nodes (one for each element on the web page) arranged in their correct hierarchical order (child nodes on top of patent nodes). The viewport overlay allows a user to see parts of the underlying structure of the document together with the surrounding original content. The viewport overlay can be moved over the document to provide a "see-through window" to the page's structure at the same location over the document as the position of the original content. The amount of detail or depth of the document's node-hierarchy that is visible, the size of the viewport overlay, and the opacity of the viewport overlay are easily changeable. In addition, multiple viewport overlays may be opened on a document to view different parts of the document's structure simultaneously. The method also displays elements in pre-determined colors based on the depths from the root element, making it easier to see the depth-hierarchy.

A new element is created for every visible element on the webpage. This element is positioned above the corresponding document element and colored according to its depth from the root element. All of these elements are placed as a child element of a new layer. The z-order of these elements is based on their corresponding document element's depth from the root element and z-order.

Advantageously, the present invention allows a user to simultaneously view the actual content of a document as well as its underlying structure, in addition to providing a visual representation of the relationships between the elements of a document. This is beneficial to users of web development software tools such as ADOBE® DREAMWEAVER®, ADOBE® MUSE®, and the like.

Various embodiments of an apparatus and method for visualizing the underlying structure of a document using an interactive viewport overlay are described. In the following detailed description, numerous specific details are set forth to provide a thorough understanding of the claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

FIG. 1 depicts a block diagram of an apparatus 100 for visualizing the underlying structure of a document using an interactive viewport overlay, according to one or more embodiments of the invention. Embodiments of the apparatus 100 include a client computer 102, and a web server 104, communicatively coupled to one another via a network 106.

The client computer 100 is any computing device, such as desktop computers, laptops, tablet computer, smart phones, personal digital assistants (PDAs), cellular phones, and the like. The client computer 102 includes a CPU 108, support circuits 110, a user-interface 112, and a memory 114. The CPU 108 may include one or more commercially available microprocessors or microcontrollers that facilitate data processing and storage. The various support circuits 110 facilitate the operation of the CPU 108 and include one or more clock circuits, power supplies, cache, input/output circuits, displays, and the like. The memory 114 includes at least one of Read Only Memory (ROM), Random Access Memory (RAM), disk drive storage, optical storage, removable storage and/or the like. The memory 114 includes an operating system 116, a document 118, a viewport generator 126, and a viewport overlay 128. The document 118 includes a plurality of elements 120. Each element 120 has a z-order 122 and other information 124 associated with different attributes/structure of the element, such as an HTML tag, HTML class, and the like.

The web server 104 includes a plurality of documents 130. The network 106 includes a communication system that connects computers (or devices) by wire, cable, fiber optic and/or wireless link facilitated by various types of well-known network elements, such as hubs, switches, routers, and the like. The network 106 may employ various well-known protocols to communicate information amongst the network resources. For example, the network 106 may be a part of the Internet or Intranet using various communications infrastructures, such as Ethernet, Wi-Fi, Wi-Max, General Packet Radio Service (GPRS), and the like.

In some embodiments, the viewport generator 126 may access the document 130 from the web server 104. In other embodiments, the document 118 resides on the client computer 102 until development is complete on the document 118 and the document 118 is deployed to the web server 104. As noted above, the document 118 includes a plurality of elements 120. The viewport generator 126 creates one new element for a corresponding one of each visible element 120 of the document 118. For each element, the z-order 122 is determined for the element. The z-order 122 is the document element's depth from the root HTML element. The viewport generator 126 creates an overlay 128, i.e., the viewport overlay, for a pre-determined area around the current location of the mouse pointer. The viewport overlay 128 includes each new element positioned above the corresponding document element 120 and colored according to its depth from the root element. The viewport overlay 128 also includes information 124 about the different attributes/structure of the element, such as its HTML tag and/or HTML class, and the like.

The viewport generator 126 receives input via the user-interface 112 for modifying one or more characteristics of the viewport overlay 128. For example, as the mouse pointer moves across the document 118, the viewport generator 126 generates an overlay 128 including information about the document elements that are within a predefined area around the current location of the mouse pointer. The viewport generator 126 may respond to commands to increase or decrease the size of the viewport overlay, by increasing the size and view of the viewport overlay. The viewport generator 126 may respond to increase or decrease the level of detail or depth of the node-hierarchy that is visible within the viewport overlay, by generating the viewport overlay 128 such that elements 120 with higher z-scores 122 are visible and those with lower z-scores are not visible. The viewport generator 126 may also respond to a command to increase or decrease the opacity of the overlay 128. Less opacity allows visualization of the original content of the document 118. As overlay opacity increases, the original content of the document 118 is obscured by the overlay 128 and the visibility of the information provided in the overlay 128 increases. The viewport generator 126 may respond to a command to view an additional viewport at a selected location in the document 118 by generating a second overlay 128 including information about the elements around the selected location.

Advantageously, the invention may be used in authoring tools, for example, ADOBE® DREAMWEAVER® or ADOBE® MUSE®, by allowing an author to inspect the structure of a document, for example an HTML document, when the author is viewing the document in preview mode (i.e., the mode in the authoring tool where the HTML document is shown in its rendered form, rather than its HTML source). The invention may also be used by browsers such as MOZILLA FIREFOX, GOOGLE CHROME or MICROSOFT INTERNET EXPLORER by providing the functionality as a part of the built-in or add-on web development tools, such as Google's Chrome DevTools or Firefox's Firebug plug-in/extension. These tools may allow the user to inspect the structure of a webpage that the user is currently viewing in the browser, by showing the overlay as described in the invention. Since the invention works on rendered documents such as web pages, the invention may be used for existing web pages as well as content generated by web content management systems.

Figure 2A:
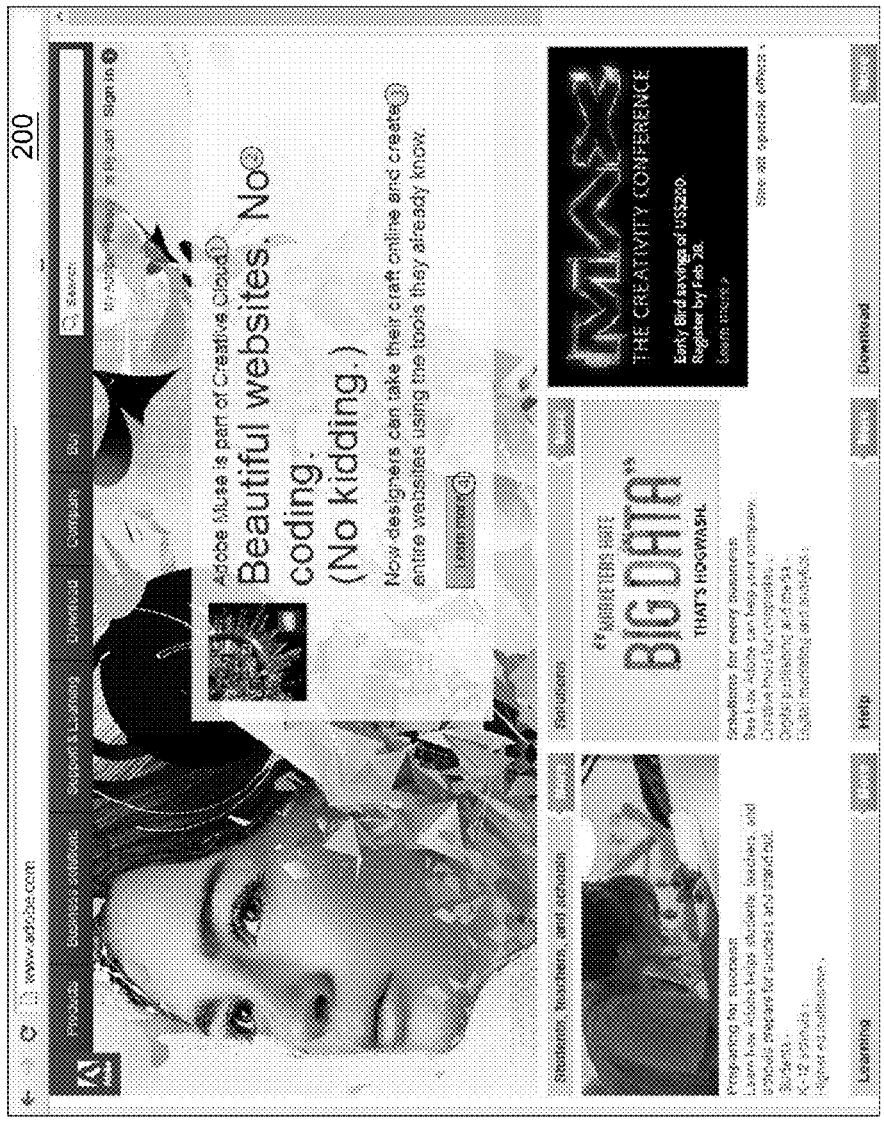
FIGS. 2A-2C depict a document on which an overlay is created by the viewport generator of FIG. 1, according to one or more embodiments of the invention.
Figure 2B:
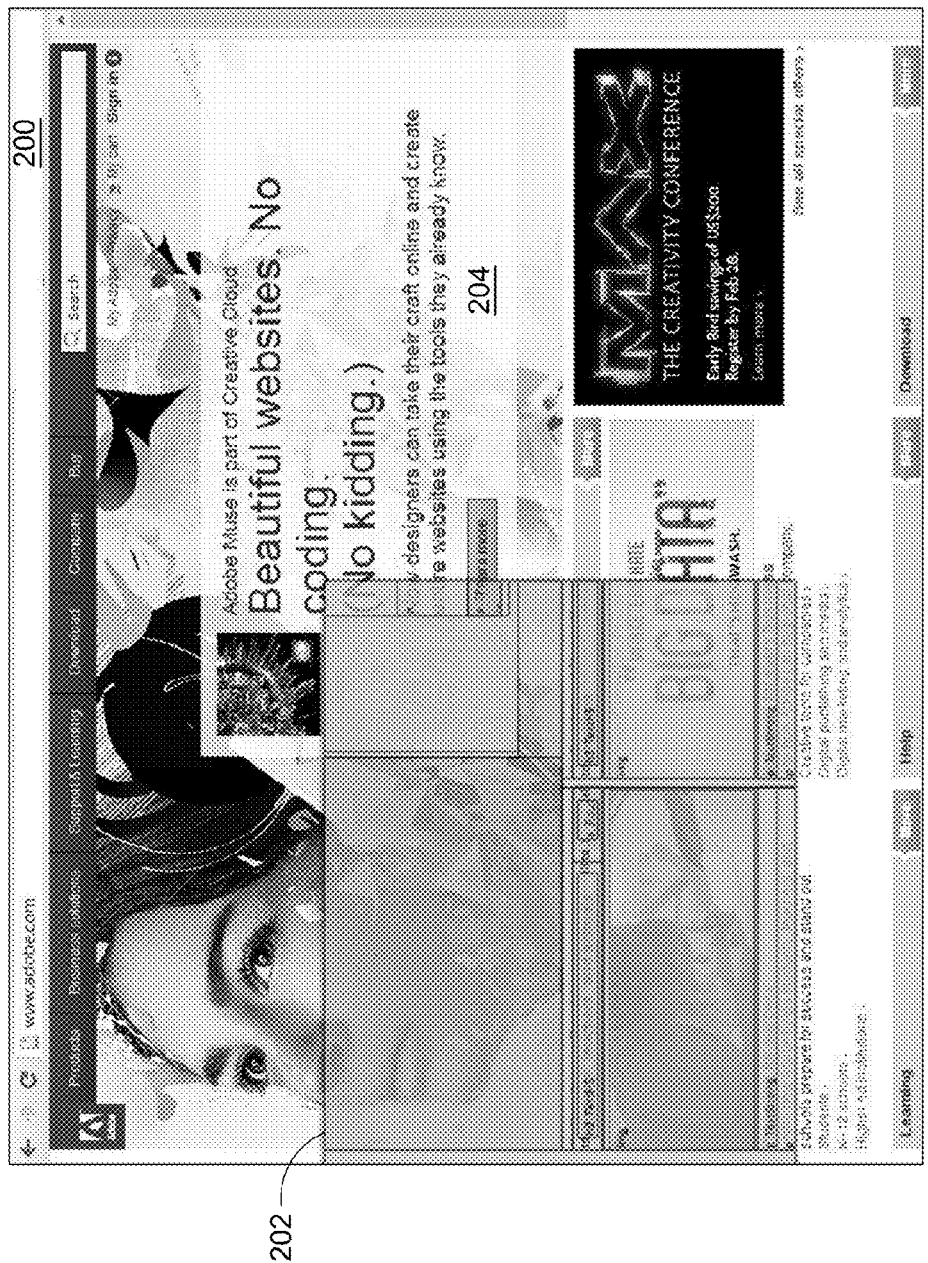
Figure 2C:

FIGS. 2A-2C depict a document 200 on which an overlay 212 is created by the viewport generator 126 of FIG. 1, according to one or more embodiments of the invention. In this embodiment, the document 200 is an ADOBE® web page. FIG. 2A depicts the document 200 without an overlay. FIG. 2B depicts the document 200 with a transparent overlay 202 with the underlying web page 204 visible through the overlay. FIG. 2C depicts the document 200 with overlay 202, however, the opacity of the overlay is set such that the underlying web page 204 cannot be seen through the overlay 202.

Figure 3:
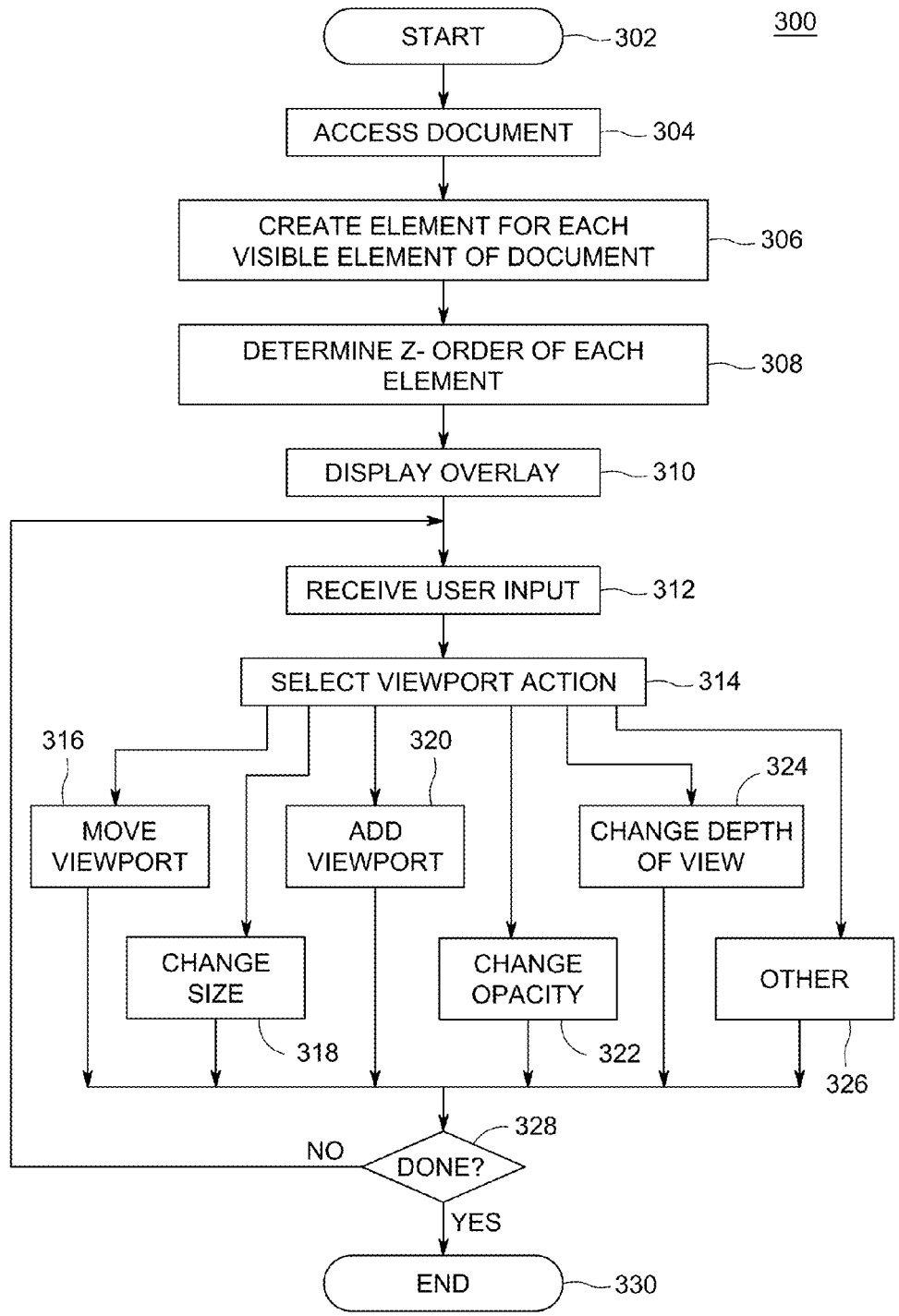
FIG. 3 depicts a flow diagram of a method for generating the viewport overlay as performed by the viewport generator of FIG. 1, according to one or more embodiments of the invention.

FIG. 3 depicts a flow diagram of a method 300 for generating the viewport overlay as performed by the viewport generator 126 of FIG. 1, according to one or more embodiments of the invention. The method 300 determines the structure of the document and generates an overlay to view the structure. The method 300 may modify the viewport based on the user input. The method 300 describes the creation of a single overlay, however two or more overlays may be created on document/web page. Each overlay has a size, opacity, and depth independent of the other overlays on the document.

The method 300 starts at step 302, and proceeds to step 304. At step 304, the method 300 accesses a document. The document may be a web page, a digital newspaper, or any document that has a hierarchical structure.

The method 300 proceeds to step 306, where the method 300 creates a new element for each visible element of the document. The method 300 inspects every DOM node on the document. The method 300 uses HTML DOM JavaScript Application Programming Interfaces (APIs). The method 300 starts with the document.body and using APIs such as, but not limited to, (Node).childNodes, (Element).tagName, (Element).getAttribute, and (HTMLElement).className, inspects every DOM node on the document and queries the node's tag name (e.g., "img", "div") and the nodes class names and attributes (e.g., cascading style sheet (CSS) style).

For each DOM node, the method 300 creates a new HTML <div> element using, for example, using the HTML DOM API document.createElement("div")). The method 300 determines where a mouse pointer is positioned on the document and finds the visible elements within a pre-defined area around the mouse pointer. Every element is rendered as a box. Because the HTML structure often is a hierarchy of many elements, the visualization consists of many boxes containing boxes. Using the width and height properties in HTML, the sizes of the boxes can be controlled. Boxes can be positioned using positioning HTML properties such as float and position.

The method 300 proceeds to step 308, where the method 300 determines a z-order for each created element. The z-order is the depth of the created element from the root element. For example, if the document is an online newspaper, the front page of the newspaper may be the root element, having z-order=0. If the newspaper contains news articles, the articles are elements that are one-step below the root element. Therefore, an article on the front page of the newspaper would have a z-order=1. Paragraphs of the newspaper article may have a z-order=2, and so on.

The method 300 proceeds to step 310, where the method 300 displays the overlay on the document. The method 300 displays an initial overlay of a default size, for example, 500 pixels wide by 400 pixels high. The method 300 displays the initial overlay with a default opacity level, for example, 0.8 (i.e., 80%). The method 300 displays the initial overlay with a default depth, for example the maximum depth of the document. After the initial overlay is created, the method 300 displays the size, opacity and depth of the overlay per user input received in steps 316-326 described below. The method 300 positions each element within the pre-defined area around the mouse pointer above the corresponding document element, and colors the element according to its depth from the root element. Elements that are of the same depth from the root (i.e., have the same z-value) are displayed in the same color.

The method 300 proceeds to step 312, where the method 300 processes user input. User input may be received from a touch screen on a touch device, from a mouse movement, from a scroll on a mouse wheel, with keyboards shortcuts, or any input recognized by the method 300.

The method 300 proceeds to step 314, where the method 300 selects a viewport action based on the user input. It is appreciated that although FIG. 3 illustrates five potential actions, other embodiments of the present disclosure envision additional possible viewport actions.

In one embodiment, the method 300 selects a move viewport action and proceeds to step 316. At step 316, the method 300 responds to mouse pointer movement. Mouse pointer movement to a new location over the document causes the method 300 to generate the viewport overlay as performed in steps 306 through 310, for a pre-defined area around the new location. As the mouse pointer is moved over the document, the method 300 generates overlays that move in a corresponding manner over the document so as to display the document structure for the area.

In another embodiment, the method 300 selects a change in viewport overlay size and proceeds to step 318. A change size action may be in response to a scroll of the wheel mouse, such that scrolling in one direction increases the size of the viewport overlay and scrolling in the opposite direction decreases the size of the viewport overlay. The method 300 modifies the viewport overlay size using HTML width and height properties. The method 300 then generates the overlay as performed in steps 306 through 310, for the modified size viewport overlay around the location of the mouse pointer.

In another embodiment, the method 300 selects add a viewport action and proceeds to step 320. An add viewport action may be in response to a keyboard shortcut in conjunction with a mouse click, such that a new viewport overlay is added for the area around the current location of the mouse pointer. The method 300 generates the overlay as performed in steps 306 through 310, for the new viewport overlay area around location of the mouse pointer.

In another embodiment, the method 300 selects a change viewport overlay opacity action and proceeds to step 322. A change viewport overlay opacity action may be in response to a keyboard shortcut, such that the opacity of the viewport overlay is increased or decreased based on the keyboard shortcut. As the method 300 increases the opacity of the viewport overlay, the structural elements of the viewport overlay become more pronounced and the corresponding visible elements of the underlying document become less visible.

In another embodiment, the method 300 selects a change a depth of viewport overlay action and proceeds to step 324. A change a depth of viewport overlay action may be in response to a keyboard shortcut or a scroll of the mouse wheel. The method 300 generates the viewport overlay as performed in steps 306 through 310, for the new viewport depth selected by the user input. As the depth increases, elements with higher z-values are displayed in the viewport overlay. As the depth decreases, elements with lower z-values are displayed in the viewport overlay.

In another embodiment, the method 300 selects some other action by the user and proceeds to step 326. The method 300 generates the viewport overlay as performed in steps 306 through 310, for the new action selected by the user input.

The method 300 proceeds to step 328, where the method 300 determines whether the user is done. If the method 300 determines the user is not done, the method 300 proceeds to step 312, where the method 300 receives and responds to user input. If at step 328, the method 300 determines the user is done, the method 300 proceeds to step 330 and ends.

Figure 4A:
FIGS. 4A-4B depict a document on which an overlay is created by the viewport generator of FIG. 1, according to one or more embodiments of the invention.
Figure 4B:
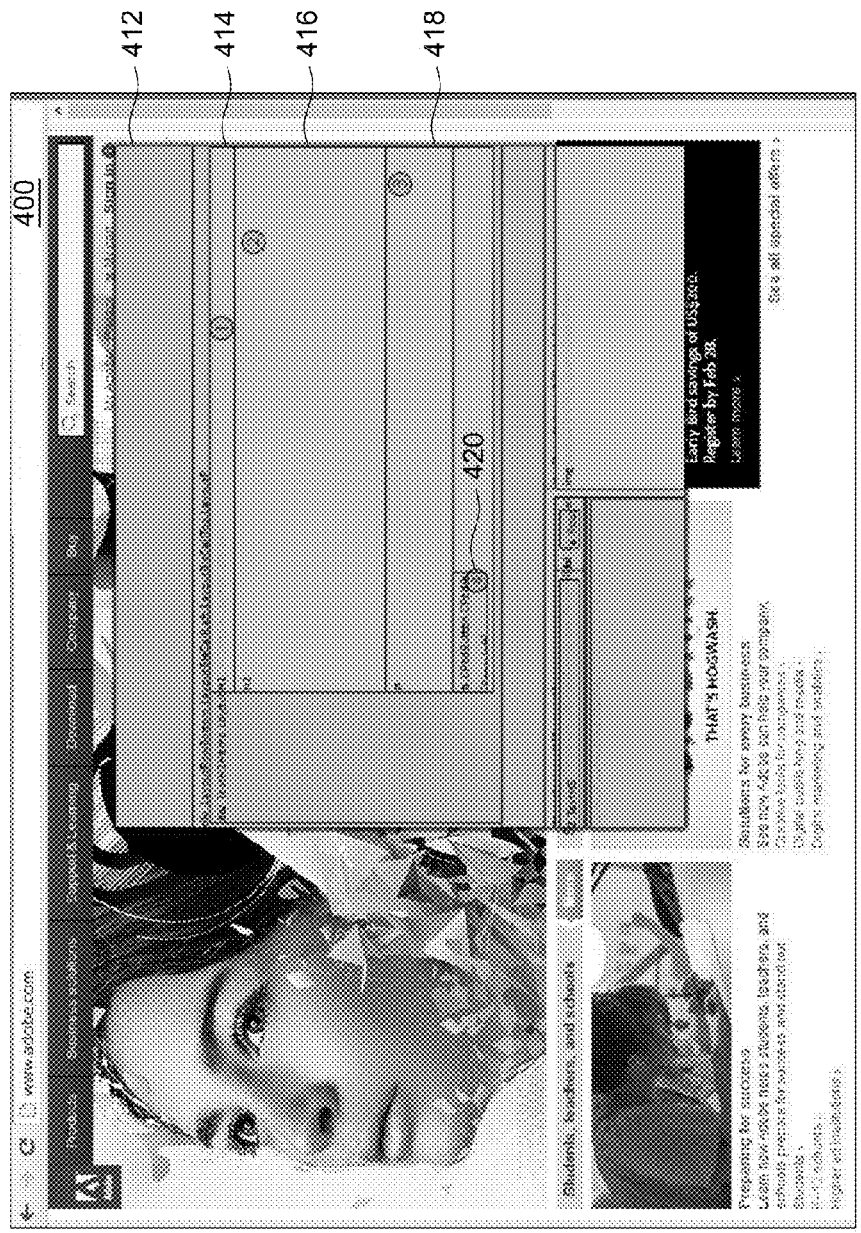

FIGS. 4A-4B depict a document 400 on which an overlay is created by the viewport generator 126 of FIG. 1, according to one or more embodiments of the invention. A position of a mouse pointer 402 determines where the overlay is generated. FIG. 4A contains elements 404, 406, 408, and 410 around the mouse pointer 402.

FIG. 4B depicts the document 400 with the overlay 412. The viewport generator creates one new element 414, 416, 418, and 420 for every visible element of the document 400. The overlay 412 covers a pre-defined area around the location of a mouse pointer. All content of the document 400 that is outside of the overlay 412 is still visible, while content that is inside the area of overlay 412 is generally not visible and instead obscured by content of the overlay 412. The overlay 412 includes each new element positioned above the corresponding document element and colored according to its depth from the root element. A new image element 414 is created and positioned directly above, so as to overlay, the corresponding document image element 404. The created elements 414, 416, 418, and 420 may also include information about the element, such as its HTML tag and/or HTML class, and the like.

The embodiments of the present invention may be embodied as methods, apparatus, electronic devices, and/or computer program products. Accordingly, the embodiments of the present invention may be embodied in hardware and/or in software (including firmware, resident software, micro-code, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer implemented method comprising:
accessing a Hyper text Markup Language (HTML) document;
identifying, within the HTML document, HTML properties of a plurality of visual objects of the HTML document;
generating a visualization of an underlying structure for the HTML document by generating structural elements for the plurality of visual objects that include the HTML properties for the plurality of visual objects, wherein the underlying structure for the HTML document comprises a structural relationship of the plurality of visual objects, the structural relationship comprising a z-value that defines the depth of the plurality of visual objects from a root element in a structural build of the HTML document;
providing, via a graphical user interface, a display of the HTML document and the plurality of visual objects;
detecting, within a view of the HTML document, a selection of a first visual object of the plurality of visual objects; and
in response to the detected selection of the first visual object, providing via the graphical user interface, an overlay comprising a boundary around an area that overlaps a corresponding area of the displayed HTML document, the overlay providing a window to the visualization of the underlying structure of the corresponding area of the displayed HTML document that the area of the overlay overlaps.

2. The method of claim 1, wherein the overlay comprises one or more selectable options for modifying a size of the overlay, an opacity of the overlay, and a depth of the overlay.

3. The method of claim 1, further comprising modifying the overlay based on user input, wherein modifying the overlay comprises at least one of: changing a size of the area of the overlay, changing an opacity the overlay, or changing a depth of view of the overlay.

4. The method of claim 3, wherein modifying the overlay based on the user input comprises changing the opacity of the overlay, wherein changing the opacity of the overlay comprises at least one of increasing or decreasing the visibility of one or more visual objects of the displayed HTML document of the corresponding area of the displayed HTML document that the area of the overlay overlaps.

5. The method of claim 1, wherein the area of the overlay overlapping the corresponding area of the displayed HTML document is a pre-defined size around a location of a mouse pointer.

6. The method of claim 1, wherein identifying HTML properties of the plurality of visual objects comprises identifying one or more tags and classes for each of the first visual object and the one or more visual objects surrounding the first visual object.

7. The method of claim 1, wherein providing the overlay comprises providing an overlay comprising both the corresponding area of the displayed HTML document and the display of the underlying structure of the corresponding area of the HTML document that the area of the overlay overlaps.

8. A non-transitory computer readable medium for storing executable code that, when executed by a processor, causes the processor to perform a method for visualizing the underlying structure of a document using an interactive viewport overlay, the method comprising:
accessing a Hyper text Markup Language (HTML) document;
identifying, within the HTML document, HTML properties of a plurality of visual objects of the HTML document;
generating a visualization of an underlying structure for the HTML document by generating structural elements for the plurality of visual objects that include the HTML properties for the plurality of visual objects, wherein the underlying structure for the HTML document comprises a structural relationship of the plurality of visual objects, the structural relationship comprising a z-value that defines the depth of the plurality of visual objects from a root element in a structural build of the HTML document;
providing, via a graphical user interface, a display of the HTML document and the plurality of visual objects;
detecting, within a view of the HTML document, a selection of a first visual object of the plurality of visual objects; and
in response to the detected selection of the first visual object, providing via the graphical user interface, an overlay comprising a boundary around an area that overlaps a corresponding area of the displayed HTML document, the overlay providing a window to the visualization of the underlying structure of the corresponding area of the displayed HTML document that the area of the overlay overlaps.

9. The non-transitory computer readable medium of claim 8, wherein the overlay comprises one or more selectable options for modifying a size of the overlay, an opacity of the overlay, and a depth of the overlay.

10. The non-transitory computer readable medium of claim 8, further comprising modifying the overlay based on user input, wherein modifying the overlay comprises at least one of: moving the overlay to a different area of the view of the HTML document, changing of a size of the overlay, changing an opacity of the overlay, or changing a depth of view of the overlay.

11. The non-transitory computer readable medium of claim 10, wherein modifying the overlay based on the user input comprises changing the opacity of the overlay, wherein changing the opacity of the overlay comprises at least one of increasing or decreasing the visibility of one or more visual objects of the displayed HTML document of the corresponding area of the displayed HTML document that the area of the overlay overlaps.

12. The non-transitory computer readable medium of claim 8, wherein the area of the overlay overlapping the corresponding area of the displayed HTML document is a pre-defined size around a location of a mouse pointer.

13. A viewport generator apparatus for visualizing the underlying structure of a document using an interactive viewport overlay comprising:
    at least one processor; and
    at least one non-transitory computer readable medium storing instructions thereon that, when executed by the at least one processor, cause the apparatus to: access a Hyper text Markup Language (HTML) document;
    identify, within the HTML document, HTML properties of a plurality of visual objects of the HTML document;
    generate a visualization of an underlying structure for the HTML document by generating structural elements for the plurality of visual objects that include the HTML properties for the plurality of visual objects, wherein the underlying structure for the HTML document comprises a structural relationship of the plurality of visual objects, the structural relationship comprising a z-value that defines the depth of the plurality of visual objects from a root element in a structural build of the HTML document;
    provide, via a graphical user interface, a display of the HTML document and the plurality of visual objects;
    detect, within a view of the HTML document, a selection of a first visual object of the plurality of visual objects; and
    in response to the detected selection of the first visual object, providing via the graphical user interface, an overlay comprising a boundary around an area that overlaps a corresponding area of the displayed HTML document, the overlay providing a window to the visualization of the underlying structure of the corresponding area of the displayed HTML document that the area of the overlay overlaps.

14. The apparatus of claim 13, wherein the overlay comprises one or more selectable options for modifying a size of the overlay, an opacity of the overlay, and a depth of the overlay.

15. The apparatus of claim 13, wherein the instructions further cause the computer to modify the overlay based on a user input, wherein modifying the overlay comprises at least one of: moving the overlay to a different area of the view of the HTML document, changing a size of the overlay, changing an opacity of the overlay, or changing a depth of view of the overlay.

16. The apparatus of claim 15, wherein modifying the overlay based on the user input comprises changing the opacity of the overlay, wherein changing the opacity of the overlay comprises at least one of increasing or decreasing the visibility of one or more visual objects of the displayed HTML document of the corresponding area of the displayed HTML document that the area of the overlay overlaps.

17. The apparatus of claim 13, wherein the area of the overlay overlapping the corresponding area of the displayed HTML document is a pre-defined size around a location of a mouse pointer.

* * * * *